UNITED STATES PATENT OFFICE.

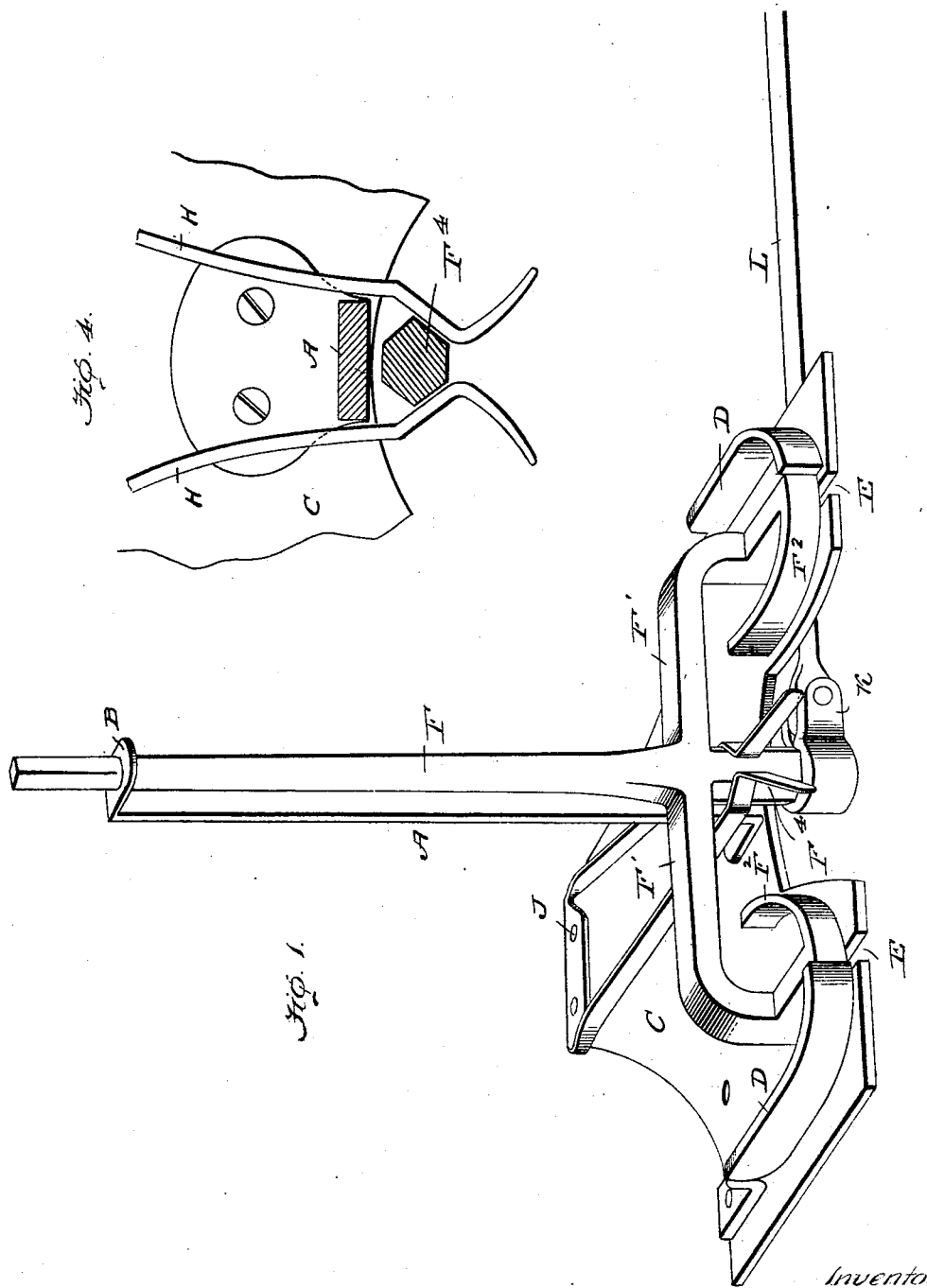

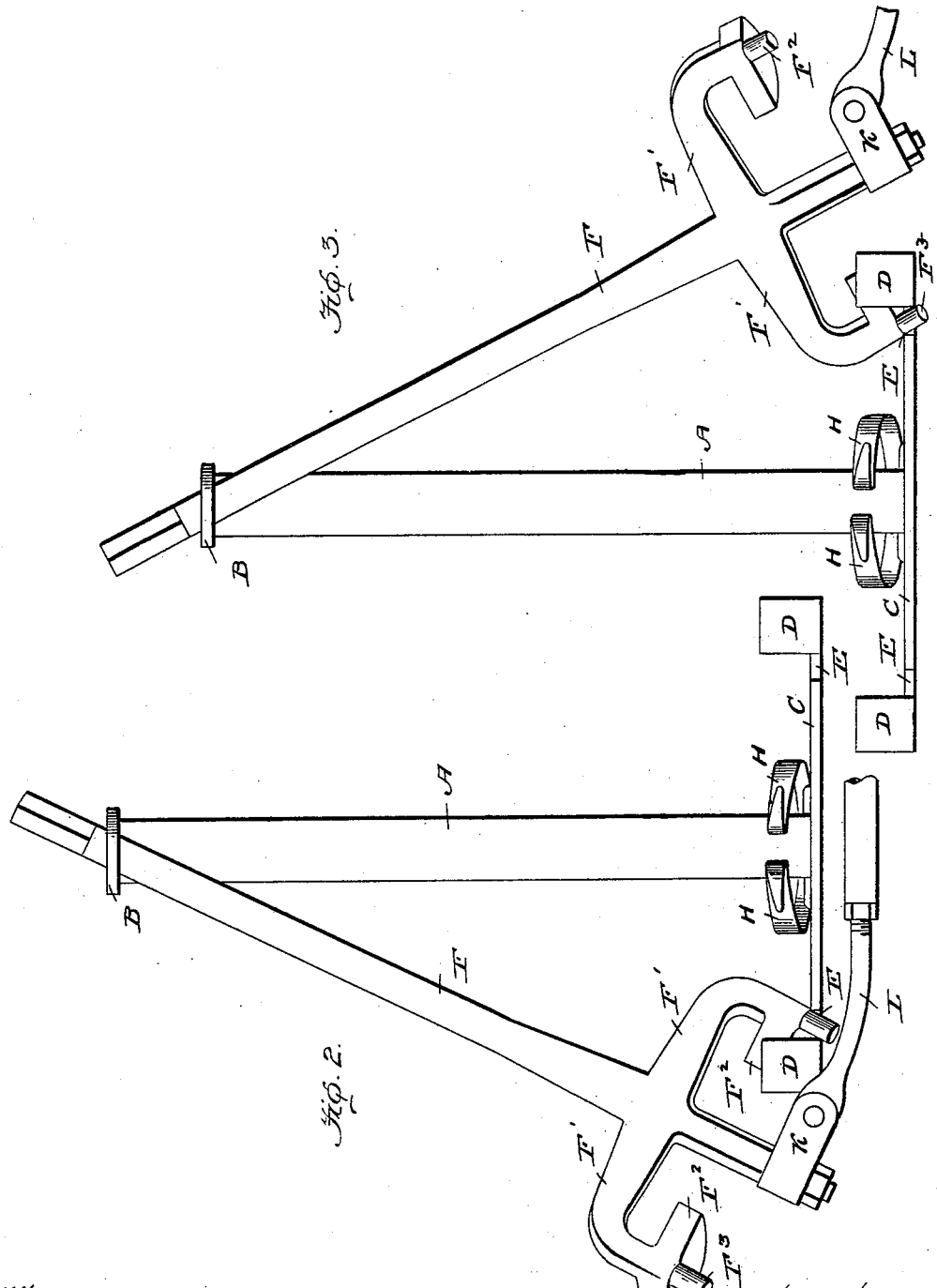

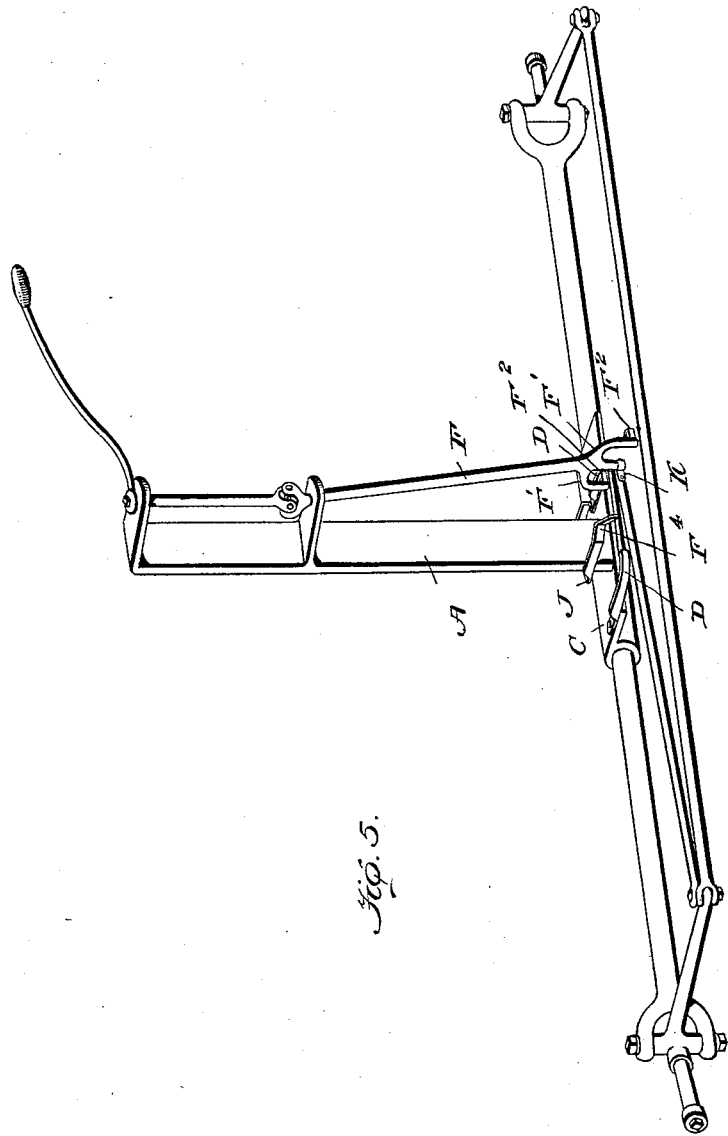

JOSEPH BARSALEAUX AND ROSWELL C. HALL, OF SANDYHILL, NEW YORK.

STEERING-GEAR FOR AUTOMOBILES.

SPECIFICATION forming part of Letters Patent No. 691,519, dated January 21, 1902.

Application filed March 29, 1901. Serial No. 53,487. (No model.)

*To all whom it may concern:*

Be it known that we, JOSEPH BARSALEAUX and ROSWELL C. HALL, citizens of the United States, residing at Sandyhill, in the county of Washington and State of New York, have invented certain new and useful Improvements in Steering-Gear for Automobiles, of which the following is a specification, reference being had therein to the accompanying drawings.

Our invention relates to improvements in steering-gear for automobiles; and one object of our invention is the provision of a steering-gear which can be quickly operated to turn the vehicle in either direction or allow the same to be run on a straight course and which will absolutely prevent rattling and jar to the handle or steering-bar.

Another object of our invention is the provision of a steering-gear which will be of simple, inexpensive, and practical construction and which can be applied to any form of motor-vehicle.

Another object of our invention is the provision of a steering-gear which will normally remain locked when the vehicle is traveling on a straight course, but which may be quickly shifted to right or left as occasion demands, and which double-acting gear will be small and compact in size and of ornamental appearance and not mar the vehicle to which it is applied.

To attain the desired objects, our invention consists of a steering apparatus embodying novel features of construction and combination of parts substantially as disclosed herein.

Figure 1 represents a perspective view of our double-acting steering-gear, the parts being in the position they occupy when the vehicle is traveling on a straight road or course. Fig. 2 represents a front view of the gear, the parts being in the position they assume when shifted to the left; and Fig. 3 represents a similar view with the parts in the position occupied when turned to the right. Fig. 4 represents a detail view, on an enlarged scale, of parts of our steering-gear. Fig. 5 is a perspective view showing the application of the improvement to a vehicle.

In the drawings, A designates a stationary plate or support having at one end the eye or guide B, and to the other or inner end of said support is connected the plate C, which is raised at the rear part where the springs are attached, as hereinafter described, and is formed with the boxes or bearings D and adjacent to said boxes with the seats or recesses E. In the guide or eye of the supporting-plate A is arranged the end of the lever F, which is retained in proper position and allowed to have a swinging movement on the support by means of the said guide. The lever is provided with the arms $F'$, which are provided with the journals $F^2$, adapted to fit in the boxes or bearings, and with the studs $F^3$, which fit in the recesses or seats E on the angular plate which serve to hold the lever from displacement and rattling. The lever F is further provided with the extension $F^4$, which has the angular form and normally fits and is held from accidental displacement by means of the spring-arms H, which are made in the form of a bail or yoke and secured at J to the raised rear portion of the plate. To the extension is secured the coupling K, to which is connected the steering rod or devices L.

The operation of our steering-gear will be readily understood from the foregoing description, taken in connection with the drawings, and it is evident that when the vehicle is traveling over a straight course the parts are in the position shown in Fig. 1 and the spring-arms engage and hold the lever and prevent rattling, and when it is desired to turn the vehicle to either the right or left it is simply necessary to shift the lever from right or left by first throwing the steering-lever out at the bottom to release it from the springs and then moving the steering handle or bar in said direction, and the boxes or bearings on the plate will limit the play or movement of the lever when shifted and when in a central position will, with the spring-arms, hold the lever in locked position, the steering device thus being locked in its central and two end positions, as will be readily understood. It will also be understood that the employment of our steering-gear insures perfect safety, and the vehicle can run over a rough road or over obstructions, such as stones, without in the least affecting the gear, which will remain locked and guide the vehicle in the proper position, which is a fact of great importance, as it insures absolute safety under all conditions.

We claim—

1. In a steering-gear, the combination of a support, a shifting lever mounted upon said support having angular extension, and devices for holding and limiting the movement of said lever.

2. In a steering-gear, the combination of a support, a lever having a central extension adapted to be engaged to hold the lever in a straight line, and having arms adapted to be retained when shifted to either right or left.

3. In a steering-gear, the combination of a lever having a central extension, shifting devices connected to said extension, a spring for holding the lever by engaging said extension.

4. In a steering-gear, the combination of a support, a lever mounted and guided upon said support, two radial arms on said lever having each a two-part journal, a plate having bearings for said journal, and a spring for holding the lever when the vehicle is traveling on a straight line.

5. In a steering-gear, the combination with a plate having bearings, a lever having two-part journals to engage said bearings and means for holding the lever from detachment and rattling.

In testimony whereof we affix our signatures in presence of two witnesses.

JOSEPH BARSALEAUX.
ROSWELL C. HALL.

Witnesses:
HOWARD S. HALL,
GEORGE B. ORR.